Jan. 4, 1966     S. F. LETO     3,226,950

MINIATURE JOINT COUPLING

Filed June 14, 1963

INVENTOR.
SALVATORE F. LETO

United States Patent Office 3,226,950
Patented Jan. 4, 1966

3,226,950
MINIATURE JOINT COUPLING
Salvatore F. Leto, 75 College Ave., Arlington, Mass.
Filed June 14, 1963, Ser. No. 287,860
1 Claim. (Cl. 64—8)

This invention comprises a new and improved joint coupling for shafting, particularly adapted by its structure to be utilized in miniature form.

It is designed to provide low cost installation of connected components by eliminating the necessity of precise shaft alignment. It has the advantages of compensating for angular, radial and lateral misalignment in shaft location without introducing loads or acceleration errors.

Further, it operates as a constant velocity assembly, exhibits low friction loss and has a low moment of inertia. It will operate well at high speeds for long periods of time without attention. It may be constructed of electric insulating material and so serve as an effective insulating medium between shafts or other components connected thereby.

I have discovered that these and other advantages are achieved in a joint coupling that includes in its structure a pair of socket members presenting opposed recesses having longitudinal grooves in their inner walls and an annular rib at the open mouth of each recess, the combination with a connecting plug having an elongated body of smaller cross section than the space enclosed by the annular ribs and spaced rounded bosses or knobs at both ends fitting the grooves of the socket members and having an aggregate cross sectional area corresponding to that enclosed or defined by the annular ribs. By constructing either the socket members or the plug of a synthetic resinous plastic which is slightly resilient the components of the joint may be readily assembled by forcing the bosses or knobs of the plug past the annular ribs of the socket members and into the recesses behind the ribs. Moreover, since the bosses are formed as integral parts of the plug the coupling requires no loose parts except the plug itself.

These and other features of the invention will be best understood and appreciated from the following description of a preferred embodiment thereof, selected for purposes of illustration and shown in the accompanying drawings, in which—

Figure 1:
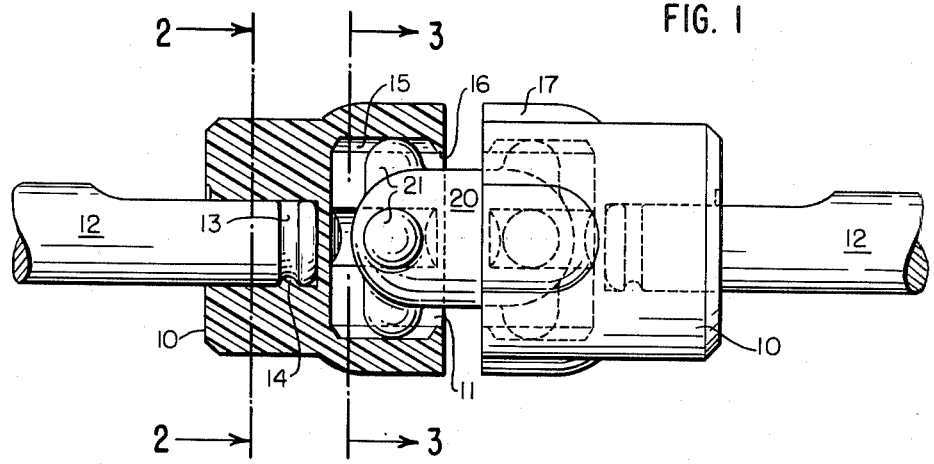
Figure 2:
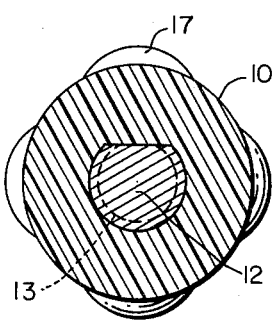
Figure 3:
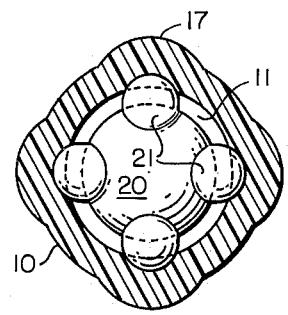
Figure 4:
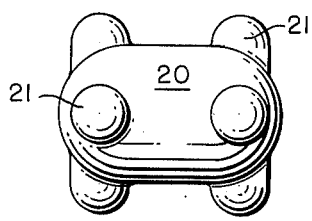

FIG. 1 is a view of the coupling in elevation showing one of the socket members in section and at about five times size, FIGS. 2 and 3 are cross sectional views on the lines 2—2 and 3—3 respectively of FIG. 1, and FIG. 4 is a view in elevation of the plug member of the coupling.

My improved coupling comprises two socket members 10 herein shown as being identical in shape but not necessarily so. These members are cylindrical in shape being shouldered to define an outer portion of slightly reduced diameter. This portion of both members is provided with a flat-sided bore to receive and retain the ends of two shafts 12. The ends of the shafts 12 are flattened on one side and provided with circumferential groove 13 close to the end of the shaft. The bore of each socket member is of complementary shape, that is to say, it is flattened on one side and provided with an annular rib 14 which may be snapped into the groove 13 by moderate longitudinal pressure whereupon the shaft 12 will be held in non-rotative engagement with the socket member.

The enlarged portion of each socket member is provided with a cylindrical recess 11 provided with a series of longitudinal grooves 15 in its inner wall. The open mouth of the recess 11 is defined by an annular rib 16.

The two socket members are united by an integral, one-piece plug 20 which is substantially cylindrical in shape having rounded ends from each of which projects laterally a series of rounded bosses or knobs 21. These bosses are of such dimension as to make a sliding fit within the grooves 15 of the socket members and have as a group an overall outside diameter greater than the interior diameter of the recesses 11 of the socket members.

In practice the socket members or the plug or all three of them may be molded of an electrically insulating resinous plastic material so that the coupling becomes an effective insulating medium between the shafts connected thereby. Each of the elements may be molded as an integral piece from polyethylene such as "Teflon" (polytetrafluoroethylene), "Kal-F" (polydifluoroethylene), or nylon or cellulose acetate, all of which have sufficient resiliency to permit the bosses 21 of the plug to be forced past the annular rib 16 of the socket member opposite to the groove 15 and also to permit the annular rib 14 to be snapped into the groove 13 of the shaft.

Polyurethane is another and particularly satisfactory material for the elements of the joint in that it will not relax over long periods of time. When polyurethane is used the connection with a shaft may be made through the medium of an interference fit between a plug of polyurethane and a knurled surface on the shaft, thus eliminating the necessity for a screw or pin in the connection. These superior physical qualities of polyurethane are in addition to its high insulating property.

The larger portion of each socket member 10 is herein shown as being reinforced by a series of radially spaced shallow external ribs 17, one opposite to each of the internal longitudinal grooves 15. The rib 16 may extend about the whole circumference of the recess 11 or may be interrupted between the grooves 15 so as to leave a lip at the outer end of each groove.

It will thus be apparent that the coupling of this invention may be produced of a molded plastic material at low cost and may be attached to a shaft without use of screws or other fastenings. Thus it has the advantages of low cost of assembling upon the shaft with assured accuracy of angular position.

Having thus disclosed my invention and described in detail an illustrative embodiment thereof, I claim as new and desire to secure by Letters Patent:

A miniature joint coupling comprising a pair of socket members in combination with an interconnecting and partially enclosed integral, one piece plug, each of the socket members having a cylindrical body apertured at its outer end to receive and retain a shaft and having at its inner end a cylindrical recess bounded by a resilient annular rib and provided with radially spaced longitudinally extending grooves, the said plug having an elongated body merging at both ends into substantially spherical radially spaced bosses formed as integral parts of the plug and fitting in the grooves of the socket members, and having as a group an overall outside diameter greater than the interior diameter of the cylindrical recesses of the socket member enclosing the end of the plug, each of the socket members being reinforced by a series of external longitudinal ribs, one located opposite to each longitudinal groove in the inner wall of the recess.

References Cited by the Examiner

UNITED STATES PATENTS

| | | | |
|---|---|---|---|
| 665,175 | 1/1901 | Carpenter | 64—7 |
| 1,310,021 | 7/1919 | Johnson | 64—8 |
| 2,333,025 | 10/1943 | Mayer | 64—1 |
| 2,365,772 | 12/1944 | O'Malley | 64—8 |
| 2,558,589 | 6/1951 | Skolfield. | |
| 2,699,656 | 1/1955 | Anderson | 64—9 |
| 2,841,966 | 7/1958 | Belden et al. | 64—9 |
| 2,924,954 | 2/1960 | Panhard | 64—9 |
| 2,998,717 | 9/1961 | Schwenk | 64—13 |
| 3,098,365 | 7/1963 | Pearson | 64—7 |
| 3,112,625 | 12/1963 | Leto | 64—8 |

BROUGHTON G. DURHAM, *Primary Examiner.*

ROBERT C. RIORDON, *Examiner.*